(12) United States Patent
DaCosta (10) Patent No.: US 7,451,327 B2
(45) Date of Patent: *Nov. 11, 2008

(54) METHOD FOR SECURING SOFTWARE VIA LATE STAGE PROCESSOR INSTRUCTION DECRYPTION

(75) Inventor: Behram Mario DaCosta, San Jose, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,693

(22) Filed: May 1, 2006

(65) Prior Publication Data

US 2007/0192595 A1    Aug. 16, 2007

Related U.S. Application Data

(63) Continuation of application No. 09/802,003, filed on Mar. 7, 2001, now Pat. No. 7,039,814.

(51) Int. Cl.
*H04L 9/32* (2006.01)
(52) U.S. Cl. ....................................... 713/189; 713/193
(58) Field of Classification Search ......... 713/189–194; 726/22, 26; 380/200
See application file for complete search history.

(56) References Cited

U.S. PATENT DOCUMENTS

| 4,465,901 | A | | 8/1984 | Best | |
|---|---|---|---|---|---|
| 5,159,633 | A | * | 10/1992 | Nakamura | .................... 380/30 |
| 5,278,905 | A | | 1/1994 | McNair | |
| 5,392,351 | A | | 2/1995 | Hasebe et al. | |
| 5,982,887 | A | | 11/1999 | Hirotani | |
| 6,345,359 | B1 | * | 2/2002 | Bianco | ....................... 713/190 |
| 6,408,387 | B1 | | 6/2002 | Wells | |
| 6,446,050 | B1 | | 9/2002 | Kondo et al. | |
| 7,039,814 | B2 | * | 5/2006 | DaCosta | ..................... 713/189 |

* cited by examiner

*Primary Examiner*—Hosuk Song (57) ABSTRACT

Embodiments of the present invention disclose a method and system for protecting the security of encrypted software. Specifically, the present invention pertains to a method of decrypting only those steps or portions of the software that are written to a processor's internal instruction cache. While in storage in non-volatile memory and in RAM, encrypted software remains in an encrypted state. The invention includes a decryption unit that may be located internal to the processor and performs decryption of the software as it enters the instruction cache. By use of this method, encrypted software is resistant to copying from RAM in a decrypted state for subsequent reverse engineering. Software that is protected by this method could be any intellectual property meant to processed by computer that is delivered to the user by internet, cable, direct satellite, packaged media, or any other means.

34 Claims, 6 Drawing Sheets

METHOD FOR SECURING SOFTWARE VIA LATE STAGE PROCESSOR INSTRUCTION DECRYPTION

This patent application is a Continuation of commonly-owned patent application Ser. No. 09/802,003, filed on Mar. 7, 2001 now U.S. Pat. No. 7,039,814, entitled "A METHOD FOR SECURING SOFTWARE VIA LATE STAGE PROCESSOR INSTRUCTION DECRYPTION", by Behram Mario DaCosta, which is incorporated herein by reference.

FIELD OF THE INVENTION

The present invention relates to a method for providing improved security for software.

BACKGROUND OF THE INVENTION

It is often important to secure the software that runs on a computing device. For example, software that runs in a digital television might include confidential algorithms which should not be revealed to the competition. As computer software becomes more sophisticated it often contains intellectual property in the form of algorithms or procedures, and keeping these from the competition can be crucial, especially as shorter and shorter times-to-market become more important to product success. It is, therefore, desirable to secure the computer software (whether object code or executable code) contained in a software product that is sold or otherwise accessed by potential adversaries, so that this software/code cannot be decompiled or reverse engineered to yield details of the implemented design.

Software sold commercially is usually the result of significant effort on the part of the developer. The fee paid to buy and use software is the reward to the developer for the effort expended. The fee also fuels the efforts to illicitly copy software.

While copyright and patent laws legally protect software against intellectual theft, actual protection has been harder to achieve. Numerous methods have been used to provide this protection.

Historically, proprietary software was protected from illicit copying by trade secret. Software developers would only sell a compiled, machine-language, version of their software, keeping the carefully guarded source code secret. Competitors and would-be thieves, though, have developed sophisticated reverse-engineering tools that can reconstruct source code from compiled machine code.

Software developers have effectively countered reverse engineering by encrypting the compiled code with ever more complex encryption schemes. However, the code must be decrypted in order to be used in a computer, leaving open a window of assailability. Since the machine code is decrypted as it is read from the permanent storage device, for example the disk drive, into the computer's on-board RAM, competitors and thieves are able to copy the code directly from RAM for subsequent reverse engineering.

Attempts to secure software on different computing devices focus on two areas: either (a) securing the software that is stored in ROM/Flash, and/or (b) securing the software as it executes on the processor. These two techniques are outlined here:

Software is typically secured in ROM or Flash memory by preventing direct reading of code in the ROM, usually by blowing a "read" fuse on the ROM or by encrypting the software stored in ROM or Flash. Both techniques, while very simple to implement, are ineffective since once the software is decrypted and loaded into (e.g.) RAM from the ROM or Flash this decrypted software can simply be copied out of (e.g.) RAM.

It is relatively easy to decrypt (and hence difficult to secure) software that resides in ROM, Flash, or RAM. If encrypted software is stored on ROM or Flash, the large block of easily accessible encrypted software in these non-volatile memory devices makes them more susceptible to attacks in the form of hostile attempts to decrypt their contents. In addition, before the software is loaded into RAM or Flash for execution, it must be decrypted, and hence the final decrypted code in RAM or Flash can easily be copied, compromising the software's confidentiality. Software being fetched from memory in its decrypted form can also be viewed on the system bus that connects components such as ROM, Flash, RAM and the processor.

Software is typically secured while it executes by encasing the entire processor and ROM/Flash in a substance that makes it very difficult to access the physical processor or memory without destroying the computing device and hence the software that is being targeted for decryption. This technique, encasing the components to be secured, while more effective than (a) above, is inconvenient since upgrading, maintaining and debugging the enclosed system is virtually impossible. In addition, this technique often incurs a greater recurring manufacturing cost. Another method would be to develop a processor that uses its own "secret" instruction set, i.e. in a sense such a processor would run encrypted instructions. However, there would be substantial overhead and cost with such a solution, since in addition to a custom processor core, customized compilers and debugging tools would need to be developed in order to write applications for the target processor.

Another protective method is the use of hardware protection, such as a "dongle". A dongle is a hardware-based security device that attaches to the serial or parallel printer port of a desktop computer or into the PC-Card slot of a laptop. It is a hardware key that uses codes and passwords embedded inside the key to control access to software applications. A software program integrated with a dongle will only run when that dongle is attached to the computer. However, dongles themselves are liable to reverse-engineering and are yet another piece of hardware capable of failure. Additionally, dongles may not prevent illicit copying through the "assault window" on decrypted code while stored in RAM.

A need exists, therefore, for a means of safeguarding software that does not allow copying of decrypted software while resident in RAM. A further need exists that any such means avoid the need to purchase and use additional hardware. The means should also be transparent to the legitimate user, resulting in no degradation of performance.

SUMMARY OF THE INVENTION

In the solution/technique being presented, the software to be secured is stored in encrypted form on the computing device's non-volatile memory (ROM, Flash, etc.). When the software is loaded into RAM or Flash in order to be executed, it is loaded in its encrypted form. Clearly the software must be decrypted between this stage and its execution. Depending on the processor being used, this can occur in one or more stages. If the processor does not have an instruction cache then the instruction fetch to the processor would decrypt the instruction before providing the result to the processor. If the processor does have one or more instruction caches, then the cache fill instruction would decrypt the instruction fetched from memory, and write the decrypted instructions into cache. Note that, in a processor that implements more than one of the above stages, the decrypting that occurs at any one stage can be partial, whole, or none at all.

Software can be made more secure by keeping it encrypted until it is within the processor. The software is decrypted as close to when it is actually fetched and decoded by the processor core as possible. There are two particularly convenient ways the software can be decrypted, either by the cache fill code, or by the instruction fetch code. These two techniques are outlined below.

Decryption by Cache Fill Code

When a primary (L1) cache miss occurs on an instruction fetch, a line in the primary cache must be refilled from either the secondary cache or from main memory. The routine that fills this line of primary cache fetches the line from main memory (or secondary cache), and encrypts the line before updating the primary cache. The cache refill and decryption procedure will ideally be implemented securely in micro code or by hardware itself. Increasing the cache line length can help make the encryption (and decryption) algorithms more secure.

Decryption by Instruction Fetch

Prior to decoding and executing an instruction, the processor core fetches the instruction from primary cache or from main memory. This instruction fetch can also decrypt the instruction prior to the instruction being decoded. The decryption is implemented in a secure manner to prevent reverse engineering of the algorithm.

Embodiments of the present invention pertain to a method for providing improved security for software. This method provides user-transparent protection for encrypted software that does not allow the illicit copying of decrypted machine language code while it is resident in RAM. Furthermore, the method avoids the need to purchase and use additional hardware.

Embodiments of the present invention disclose a method and system for protecting the security of encrypted software. Specifically, the present invention pertains to a method of decrypting only those steps or portions of the software that are written to a processor's internal instruction cache. While in storage in non-volatile memory and in RAM, encrypted software remains in an encrypted state. The invention includes a decryption unit that may be located internal to the processor and performs decryption of the software as it enters the instruction cache. By use of this method, encrypted software is resistant to copying from RAM in a decrypted state for subsequent reverse engineering. Software that is protected by this method could be any intellectual property meant to processed by computer that is delivered to the user by internet, cable, direct satellite, packaged media, or any other means.

Disclosed is a method for improving the security of encrypted software. The method uses the steps of reading encrypted software from non-volatile storage, storing the encrypted software in temporary storage and decrypting only those portions of the encrypted software that are read into the processor's instruction cache as each of those portions is read into the cache.

BRIEF DESCRIPTION OF THE DRAWINGS

The operation of this invention can be best visualized by reference to the drawings.

SPECIFICATION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

DETAILED DESCRIPTION

For the purpose of illustrating the concepts presented in this embodiment of the present invention, the term "software" will refer to any computer data, program, instruction set, or any other computer-readable information that is stored in a computer readable medium or format. It will be typical of digital information that is delivered to a user for subsequent use in a computer system. Other embodiments of the present invention may also address digitized documents, movies, music, books, magazines, voice presentations or any other material containing intellectual property that is protectable by copyright. Embodiments can also address uses not involving copyrighted intellectual property but which still require protection from unauthorized copying or other reproduction.

Protection of software that is delivered to users for subsequent fair use has always been of significant importance to those who develop and own such intellectual property. Copyright laws, developed before the advent of computers, do not always provide actual protection when illegally copied software is indistinguishable from its legal origins.

The concept of copyright was developed in a time when the only recording medium was paper and the only method of copying a recorded document was by arduously producing another paper copy by hand. The invention of the printing press, typewriter, photography, audio recording devices, movie technology, xerography, video tape, computer memory and storage, and the internet, have each continued to erode the effectiveness of copyright laws. Because digital media can be easily transmitted worldwide and recorded by use of the internet, copy protection laws are not sufficiently effective. Producers of software have had to develop technical copy protection in the media itself.

One means of protecting against illicit use and/or copying of software is by inserting restrictive coding into the digital data stream. Since the digital data stream must be decoded by a processor in order to be usable as machine language instructions, commands can be inserted that disable copying, and possibly playback and execution. In order to properly respond to the instructions, the computer system must be enabled with a device that reads the coding correctly and most types of computers are constructed to do so. However, such protection can be bypassed by the determined wrongdoer.

Another, and very common, software protection scheme is encryption. In this method, software is encrypted using highly complex keys that make the unauthorized decryption effort much harder than seeking other means of "cracking" the machine code. Encrypted software, however, must be decrypted in order to be used. Typically, this decryption occurs at the point at which the software is read from its non-volatile storage site, usually a CD ROM or hard drive, and the point at which it is read into RAM to be readied for use.

With the embodiment of the present invention discussed herein, a means by which the "assault window," the stage in which decrypted software resides vulnerably in RAM, can be reduced if not eliminated. The means is by decryption at a later stage in the process.

The concepts underlying this embodiment of the present invention may best be understood by reference to the drawings. This discussion of this embodiment addresses the use and execution of software delivered to a legitimate user for subsequent execution on a computer system. Other embodiments may address the same concepts of protection of other forms of digital material on systems other than computers. It must be borne in mind that the form of delivery, whether by cable, internet connection, direct satellite downlink, or in package form such as a magnetic tape or a compact disk (CD) or digital video disc (DVD), has no bearing on the concepts present in the discussion of this embodiment or any other. It is the protection of the intellectual property from wrongful reproduction that is important.

Figure 1:
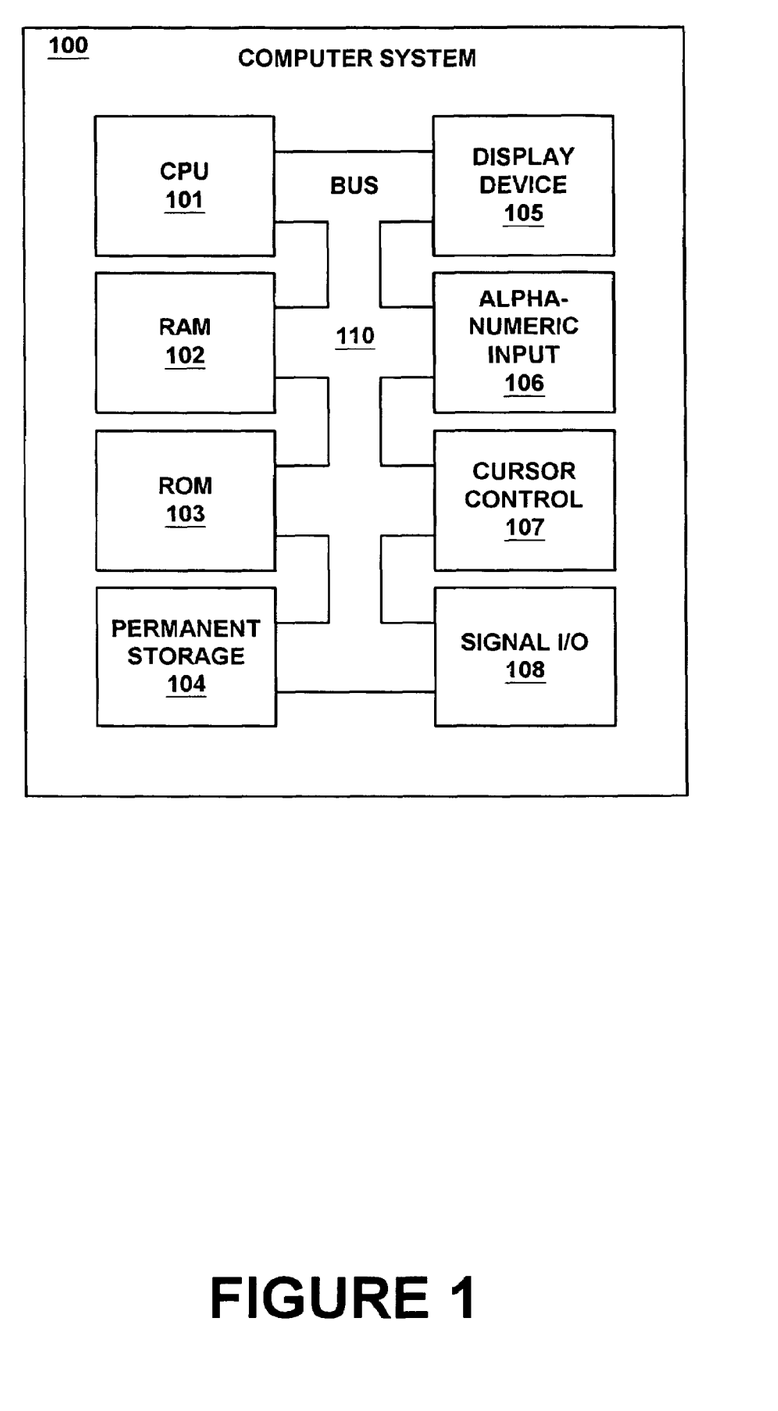
FIG. 1 illustrates a computer system in accordance with one embodiment of the present invention.

This embodiment of the present invention addresses the use of a computer system as illustrated in FIG. 1. FIG. 1 illustrates, in block diagram, a configuration of a typical computing device consistent with the methods disclosed in this embodiment of the present invention. Computer system 100 comprises bus 110 which connects processor 101, volatile RAM 102, non-volatile ROM 103 and permanent data storage device 104. Also connected to the bus are display device 105, usually a monitor; alpha-numeric input device 106, usually a keyboard; cursor control 107, sometimes implemented as a mouse; and signal I/O device 108. Signal I/O device 108 can be implemented as a serial connection, an infrared transceiver, a parallel connection or some other device.

Figure 2A:
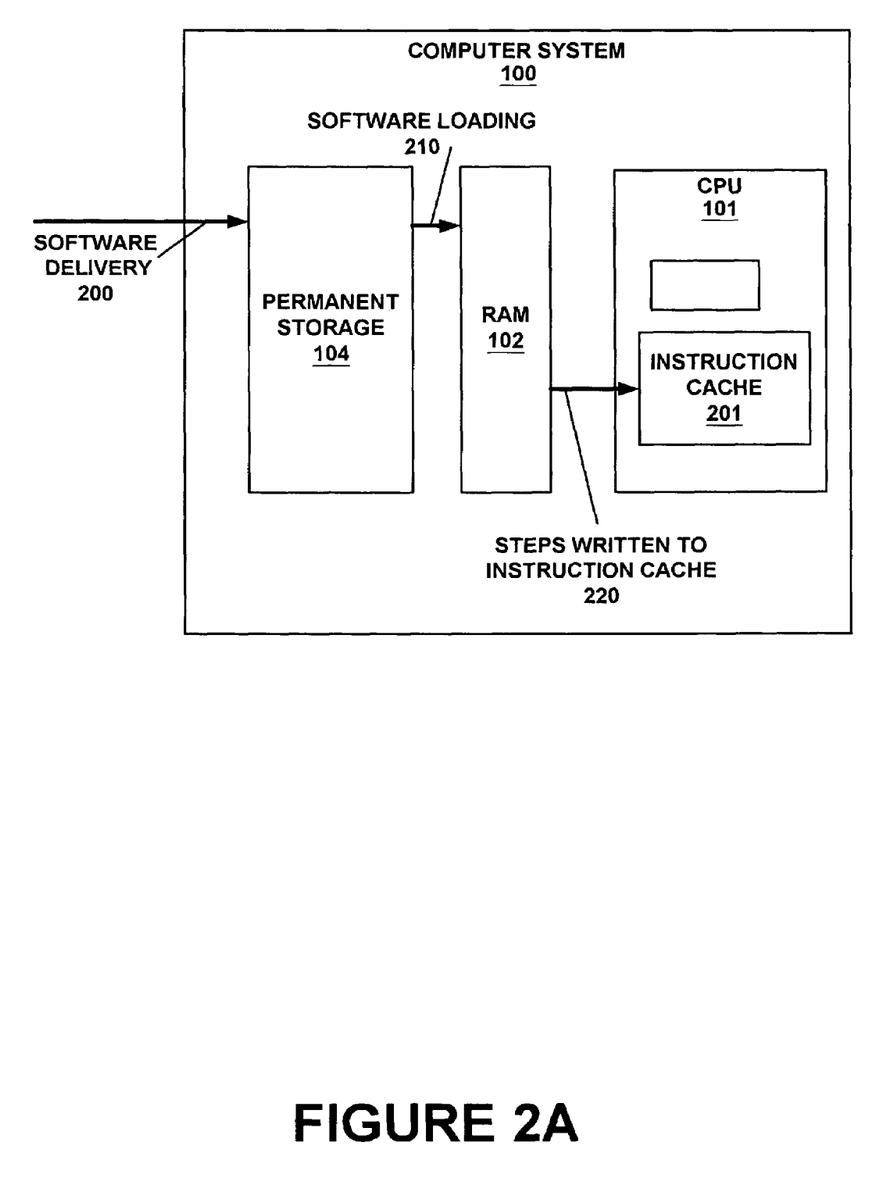
FIG. 2A illustrates a computer operation in accordance with one embodiment of the present invention.

FIG. 2A illustrates a typical operation of a computer system while executing software. Software is delivered, 200, to non-volatile storage 104. Note that the method of delivery is not important, whether by internet, intranet connection, disk or other medium. From non-volatile storage the software is loaded, 210, to RAM 102 as required. Typically, whether the permanently stored software is encrypted or not, it is unencrypted software that resides in RAM during execution. From RAM, steps or other portions of the software are called into processor 101's instruction cache 201 as required by the software's use. Each software step executed must, at some point, be written into the instruction cache. An instruction cache typically includes multiple instruction registers.

Figure 2B:
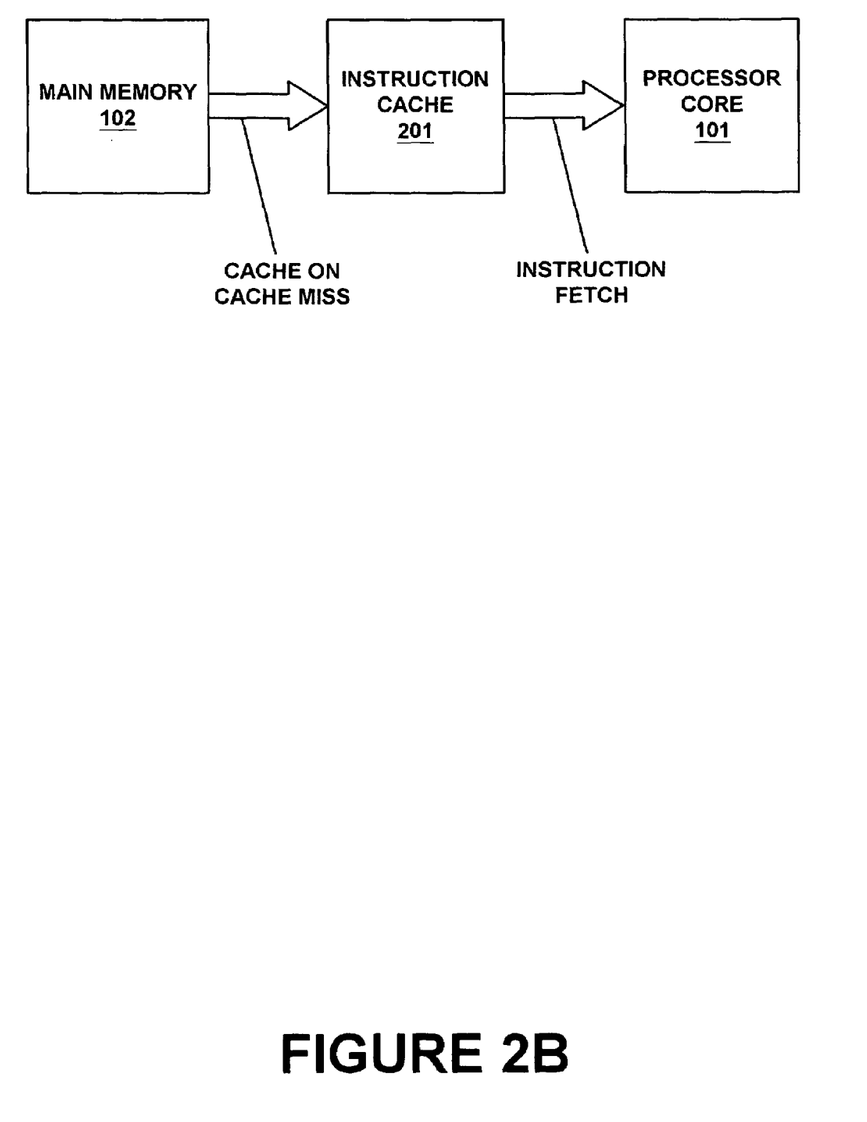
FIG. 2B illustrates an instruction fetch operation in accordance with the present invention.

The process by which instructions are written to the instruction cache is illustrated in FIG. 2B. Processor 101 issues an instruction fetch command to instruction cache 201. If the demanded instruction is in cache, it is fed to the processor core. If it is not, a cache miss, the instruction is called from main memory 102 to the cache.

Figure 3:
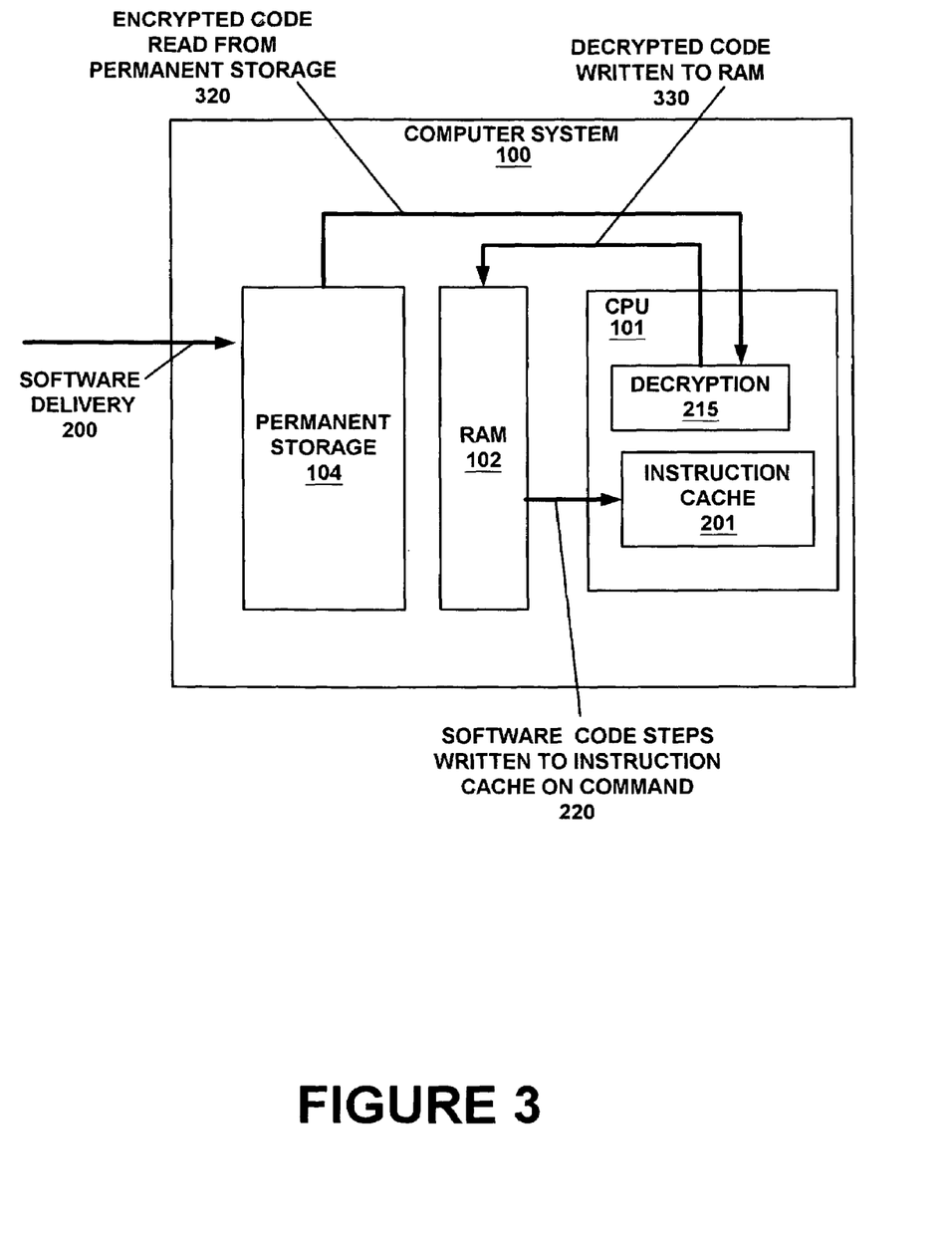
FIG. 3 illustrates another computer operation in accordance with one embodiment of the present invention.

FIG. 3 illustrates the above operation as applied to encrypted software. Encrypted software is delivered, 200, and stored, 104, in its encrypted state as discussed above. When called up for loading, encrypted software is decrypted, 215, as it is read from permanent storage 104 and then written to RAM 102. The software then resides as required in RAM in an unencrypted state. In that state in RAM, the software is accessible to copying by sophisticated tools that can copy RAM contents.

Figure 4:
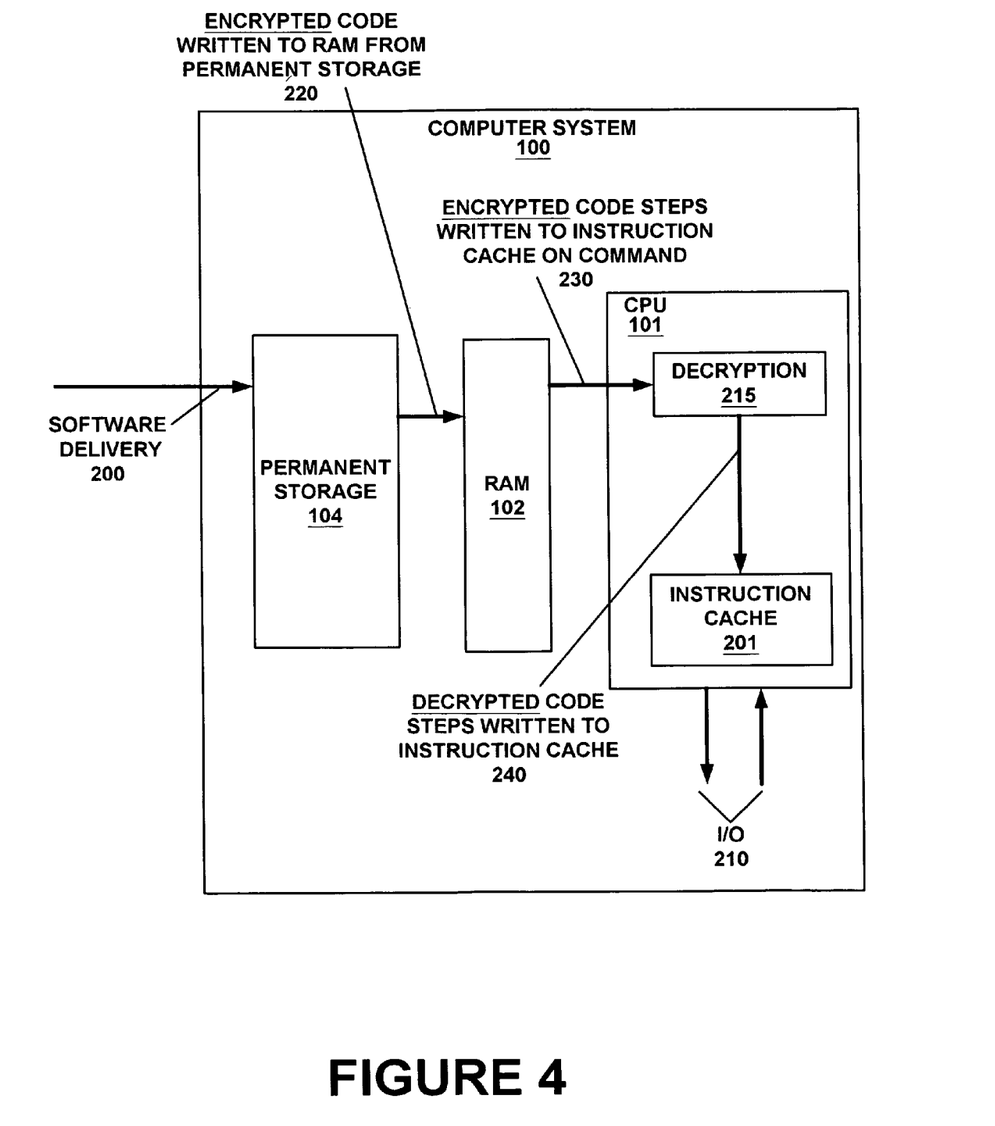
FIG. 4 illustrates yet another computer operation in accordance with one embodiment of the present invention.

FIG. 4 illustrates an embodiment of the invention by which copying from RAM can be prevented. After delivery and permanent storage as before, encrypted software is written, 220, into RAM 102 while still in its encrypted state. Then, as required by software operation, steps or other portions of the software are decrypted, 215, only as they are called into processor 101's instruction cache 201, in accordance with the present invention. Note that decryption 215 can be implemented as a hardware unit or as part of processor 101's instruction fetch command or other implementation.

The contents of an instruction cache are continually changing. Most operations of a processor alter the contents of the instruction cache, making it very difficult, if not impossible, to copy the cache contents. For this reason, decrypted portions of software that only exist in the instruction cache are extremely difficult to copy. Furthermore, those decrypted portions of software resident in the instruction cache are not stored there in any sequential manner but as the processor and its execution of the software demand them. If a would-be copier were able to read and copy the instruction cache contents, those contents would be copied in a disjointed, non-sequential, arrangement that would be yet another nearly undecipherable puzzle.

The illustrations in FIGS. 3 and 4 show decryption 215 as part of processor 101. It is shown in this manner only for the sake of clarity of the concept. The implementation of decryption may take place in any manner consistent with this embodiment of the present invention, whether by a physical means within the processor, coding within the software and thus part of the program itself, or by any other means.

Figure 5:
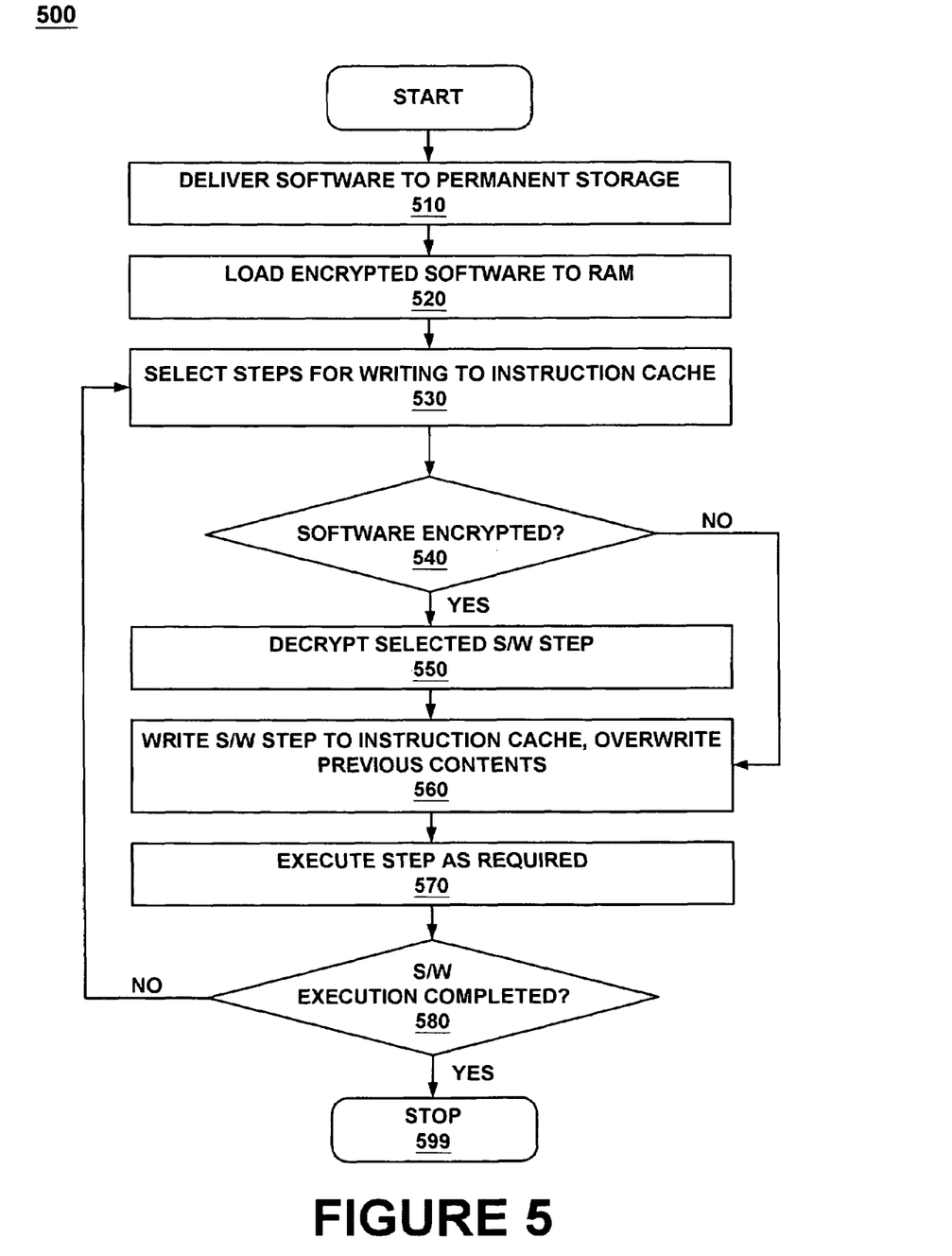
FIG. 5 illustrates a flow diagram of computer operations in accordance with one embodiment of the present invention.

FIG. 5 illustrates, in flow diagram format, a process, 500, of delivery, storage, decryption and use of software consistent with this embodiment of the present operation. Delivery of software, 510, occurs in any applicable manner, whether by network connection, packaged media or bundled in a purchased computer system. It typically remains resident in permanent storage 104. When the encrypted software is loaded for execution, it is loaded to RAM 102 at 520 in its encrypted state and remains in that state until execution calls for steps to be written to instruction cache 201 at 530.

When a step in the software is called to the instruction cache, if it is encrypted, 540, it is decrypted, 550, in the process of being written to the cache, 560. From the instruction cache it is executed as required, 570. Note that, if the software is not in an encrypted state in RAM, a selected software step does not pass through the decryption process and is written directly to the instruction cache. Once no more steps in the software are required for execution, 580, the process stops, 599.

Note that, in the above described process, the physical implementation of each step in the process is not limited to any particular device. The decryption step, for example, may be performed by the involved processor or a dedicated device within the computer system. Other steps in the process may also be performed by other means.

A method to improve the security of delivered software has been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of improving the security of digital content, said method comprising:
   receiving encrypted digital content over a digital interface;
   storing said encrypted digital content in a memory;
   fetching a portion of said encrypted digital content; and
   decrypting said fetched portion in a processor, wherein a portion of said encrypted digital content left in said memory remains encrypted, wherein said decrypting occurs contemporaneously with said fetching.

2. The method of claim 1, wherein said digital content comprises video and sound data.

3. The method of claim 1, wherein said decrypting is performed by a decryption unit located within said processor.

4. The method of claim 1, wherein said processor comprises a plurality of instruction caches, and wherein said decrypting occurs prior to writing said fetched portion into any of said plurality of instruction caches.

5. The method of claim 1, wherein said memory comprises a volatile storage medium.

6. The method of claim 5, wherein said volatile storage medium comprises random access memory.

7. The method of claim 5, wherein said volatile storage medium comprises flash memory.

8. A digital electronic system for improving security of digital content, said system comprising:
   a bus comprising a digital interface for receiving encrypted digital content;
   a memory coupled to said bus and capable of storing said encrypted digital content; and
   a processor coupled to said bus and capable of processing a portion of said encrypted digital content fetched from said memory and decrypted in said processor, wherein fetching and decryption of said portion of said encrypted digital content occur contemporaneously; and
   wherein a portion of said encrypted digital content left in said memory remains encrypted.

9. The system of claim 8, wherein said digital content comprises video and sound data.

10. The system of claim 8, wherein said decryption is performed by a decryption unit located within said processor.

11. The system of claim 8, wherein said processor comprises a plurality of instruction caches, and wherein said decryption occurs prior to writing said fetched portion into any of said plurality of instruction caches.

12. The system of claim 8, wherein said memory comprises a volatile storage medium.

13. The system of claim 12, wherein said volatile storage medium comprises random access memory.

14. The system of claim 12, wherein said volatile storage medium comprises flash memory.

15. A processor for improving security of digital content, said processor comprising:
   a bus configured to receive encrypted digital content;
   a decryption unit coupled to said bus for decrypting said encrypted digital content;
   a core coupled to said bus for processing a portion of said encrypted digital content fetched from a memory and decrypted by said decryption unit, wherein fetching and decryption of said portion of said encrypted digital content occur contemporaneously; and
   wherein a portion of said encrypted digital content left in said memory remains encrypted.

16. The processor of claim 15, wherein said digital content comprises video and sound data.

17. The processor of claim 15, wherein said processor further comprises a plurality of instruction caches, and wherein said decryption occurs prior to writing said fetched portion into any of said plurality of instruction caches.

18. A method of improving the security of digital content, said method comprising:
   receiving encrypted digital content over a digital interface;
   storing said encrypted digital content in a memory;
   fetching a portion of said encrypted digital content; and
   decrypting said fetched portion in a processor, wherein a portion of said encrypted digital content left in said memory remains encrypted, wherein said processor comprises a plurality of instruction caches, and wherein said decrypting occurs prior to writing said fetched portion into any of said plurality of instruction caches.

19. The method of claim 18, wherein said digital content comprises video and sound data.

20. The method of claim 18, wherein said decrypting is performed by a decryption unit located within said processor.

21. The method of claim 18, wherein said decrypting occurs contemporaneously with said fetching.

22. The method of claim 18, wherein said memory comprises a volatile storage medium.

23. The method of claim 22, wherein said volatile storage medium comprises random access memory.

24. The method of claim 22, wherein said volatile storage medium comprises flash memory.

25. A digital electronic system for improving security of digital content, said system comprising:
- a bus comprising a digital interface for receiving encrypted digital content;
- a memory coupled to said bus and capable of storing said encrypted digital content; and
- a processor coupled to said bus and capable of processing a portion of said encrypted digital content fetched from said memory and decrypted in said processor, wherein said processor comprises a plurality of instruction caches, and wherein said decryption occurs prior to writing said fetched portion into any of said plurality of instruction caches; and
- wherein a portion of said encrypted digital content left in said memory remains encrypted.

26. The system of claim 25, wherein said digital content comprises video and sound data.

27. The system of claim 25, wherein said decryption is performed by a decryption unit located within said processor.

28. The system of claim 25, wherein said decryption occurs contemporaneously with said fetching.

29. The system of claim 25, wherein said memory comprises a volatile storage medium.

30. The system of claim 29, wherein said volatile storage medium comprises random access memory.

31. The system of claim 29, wherein said volatile storage medium comprises flash memory.

32. A processor for improving security of digital content, said processor comprising:
- a bus configured to receive encrypted digital content;
- a decryption unit coupled to said bus for decrypting said encrypted digital content;
- a core coupled to said bus for processing a portion of said encrypted digital content fetched from a memory and decrypted by said decryption unit;
- a plurality of instruction caches, wherein said decryption occurs prior to writing said fetched portion into at least one of said plurality of instruction caches; and
- wherein a portion of said encrypted digital content left in said memory remains encrypted.

33. The processor of claim 32, wherein said digital content comprises video and sound data.

34. The processor of claim 32, wherein said decryption occurs contemporaneously with said fetching.

* * * * *